(12) United States Patent
Hoffmann et al.

(10) Patent No.: US 7,388,338 B2
(45) Date of Patent: Jun. 17, 2008

(54) DEVICE FOR BRAKING A MAGNETIC LEVITATION RAILWAY

(75) Inventors: Reinhard Hoffmann, Nuernberg (DE); Wolfgang Spaeth, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 321 days.

(21) Appl. No.: 11/077,151

(22) Filed: Mar. 11, 2005

(65) Prior Publication Data
US 2005/0212468 A1    Sep. 29, 2005

(30) Foreign Application Priority Data
Mar. 12, 2004  (DE)  ........................ 10 2004 012 287

(51) Int. Cl.
*H02P 1/00* (2006.01)
(52) U.S. Cl. ........................ 318/135; 318/587; 318/366; 104/281; 104/282
(58) Field of Classification Search ................ 318/135, 318/587, 366; 104/281, 282
See application file for complete search history.

(56) References Cited

U.S. PATENT DOCUMENTS

| 3,913,493 | A | * | 10/1975 | Maki et al. ................... 104/281 |
| 5,251,741 | A | * | 10/1993 | Morishita et al. ........ 198/690.1 |
| 6,753,666 | B2 | | 6/2004 | Fischperer |
| 2003/0227269 | A1 | | 12/2003 | Fischperer |

FOREIGN PATENT DOCUMENTS

| CN | 1456458 | 11/2003 |
| DE | 94 06 330 U1 | 7/1995 |
| DE | 199 29 620 A1 | 2/2001 |
| EP | 1352778 | 10/2003 |

* cited by examiner

*Primary Examiner*—Rina Duda
(74) *Attorney, Agent, or Firm*—Harness, Dickey & Pierce, P.L.C.

(57) ABSTRACT

A device is for braking a magnetic levitation railway, wherein the stator winding of a linear motor is short-circuited as a brake winding in a last section before an end of the route. There is a provision for two stator windings which extend alternately on the stator to be present in a penultimate section.

15 Claims, No Drawings

DEVICE FOR BRAKING A MAGNETIC LEVITATION RAILWAY

The present application hereby claims priority under 35 U.S.C. §119 on German patent application numbers DE 10 2004 012 287.3 filed Mar. 12, 2004, the entire contents of which is hereby incorporated herein by reference.

FIELD OF THE INVENTION

The present invention generally relates to a device for braking a magnetic levitation railway. More specifically, it relates to one wherein the stator winding of a linear motor is short-circuited as a brake winding in a last section before an end of the route.

BACKGROUND OF THE INVENTION

It is customary that the last section of the stator winding before the end of the route is short-circuited in a terminus station for a magnetic levitation railway. This is possible because the stator winding has separate sections which are arranged in series. As a result of the short-circuiting of the last section of the stator winding, a braking force is applied to the vehicle when a vehicle travels through this section. Since the braking force emanates from the route, braking of the vehicle is always ensured when it reaches the last section before the end of the route.

The last section must be so long that safe stopping of the vehicle is ensured even if the vehicle has accelerated until just before the last section was reached. Although it is generally ensured that the velocity of the vehicle is already reduced before the last section is reached, a fault in the control of the vehicle may nevertheless result in an undesired acceleration just before the last section of the route. In order to ensure safe stopping always, the last section before the end of the route must therefore be made so long that safe stopping is always ensured even after undesired acceleration. As a result, the costs for setting up the route are very high.

It has already been proposed to reduce the velocity of the vehicle before it reaches the last section of the route by providing the stator of the penultimate section only partially with a winding. As a result, the vehicle always enters the station at a very low velocity, which undesirably lengthens the travel times.

SUMMARY OF THE INVENTION

An embodiment of the invention may include an object of specifying a device for braking a magnetic levitation railway in which the vehicle comes to a stop over as short a distance as possible with such reliability that there is no need for an additional long travel path which would only be required in the event of a fault.

An object may be achieved according to an embodiment of the invention in that two stator windings which extend alternately on the stator are present in a penultimate section.

This provides an advantage that a relatively short last section in which the stator winding is short-circuited is sufficient to be able to reliably stop the vehicle even if it had been accelerated just before the station as a result of a fault. There is thus an advantageous saving in building costs without the safety of the magnetic levitation railway being adversely affected.

For example, the two stator windings which extend in the penultimate section are arranged at least partially in an overlapping fashion in a groove. For this purpose, they are mounted in an alternating fashion with electrical isolation. This provides a simple and reliable arrangement of the stator windings.

One of the two stator windings which extend in the penultimate section is connected, for example, to a drive stator winding of the section lying in front of it. Therefore, acceleration is at least partially possible in the penultimate section.

For example, one of the two stator windings which extend in the penultimate section is configured as a brake winding, as a drive-free winding or as a drive winding. It can therefore be used to accelerate or to brake or can also have no effects on the driving behavior of the vehicle.

DETAILED DESCRIPTION OF THE EXEMPLARY EMBODIMENTS

One of the two stator windings which extend in the penultimate section is preferably connected to the drive stator winding of the section lying in front of it, and the other stator winding is configured as a brake winding. As a result, at first acceleration but then braking are advantageously possible in the penultimate section because the accelerating section is usually arranged before the braking section in the direction of travel. It is ensured that the braking of the vehicle already starts at the penultimate section of the route, but not at the start of this section.

According to one particular embodiment, one of the two stator windings which extend in the penultimate section is configured as a brake winding and is connected directly in series with the brake winding in the last section. The braking is thus carried out in a particularly uniform fashion.

For example, the stator windings of the penultimate section and of the last section, which serve as brake windings, are connected to one another via a switch. As a result, the braking of the vehicle can start either in the penultimate section or only in the last section, irrespective of whether the switch is closed or open.

According to another example, one of the two stator windings which extend in the penultimate section is configured as a brake winding and is short-circuited with itself. This provides the advantage that it can also trigger braking of the vehicle alone, which provides increased reliability of the braking effect.

The winding ends of the stator winding are connected, for example, to form a star point or in a triangular circuit for the purpose of short-circuiting. This provides a reliable circuit.

For example, for each of the two stator windings extending in the penultimate section the ratio of the number of windings per unit distance increases in the direction of the last section in favor of the stator winding which is configured as a brake winding. This provides the advantage that there is an increase in the braking capacity within the penultimate section of the stator winding.

For example, the stator windings are constructed separately for the sides of the route. This provides more reliable travel and braking of the magnetic levitation railway.

The stator windings may be composed of wires which, according to requirements, have different cross sections or are composed of different material.

The device for braking a magnetic levitation railway according to an embodiment of the invention provides the advantage that reliable stopping of the vehicle at a terminus railway is always ensured without an additionally extended route beyond the terminus railway being necessary for cases of failure. Reliable stopping in good time is always ensured.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for braking a magnetic levitation railway, wherein a stator winding of a linear motor is short-circuited as a brake winding in a last section before an end of a route, and wherein two stator windings which extend alternately on the stator are present in a penultimate section, wherein the two stator windings which extend in the penultimate section are arranged at least partially in an overlapping fashion in a groove.

2. The device as claimed in claim 1, wherein one of the two stator windings which extend in the penultimate section is connected to a drive stator winding of the section lying in front of it.

3. The device as claimed in claim 1, wherein one of the two stator windings which extend in the penultimate section is configured as a brake winding, as a drive-free winding or as a drive winding.

4. The device as claimed in claim 3, wherein one of the two stator windings which extend in the penultimate section is configured as a brake winding and is connected directly in series with the brake winding in the last section.

5. The device as claimed in claim 4, wherein the stator windings of the penultimate section and of the last section, which serve as brake windings, are connected to one another via a switch.

6. The device as claimed in claim 3, wherein one of the two stator windings which extend in the penultimate section are configured as a brake winding and short circuited with itself.

7. The device as claimed in claim 1, wherein the winding ends of the stator winding are connected to form a star point or in a triangular circuit for the purpose of short-circuiting.

8. The device as claimed in claim 1, wherein for each of the two stator windings extending in the penultimate section the ratio of the number of windings per unit distance increases in the direction of the last section in favor of the stator winding which is configured as a brake winding.

9. The device as claimed in claim 1, wherein the stator windings are constructed separately for the sides of the route.

10. The device as claimed in claim 1, wherein one of the two stator windings which extend in the penultimate section is connected to a drive stator winding of the section lying in front of it.

11. The device as claimed in claim 1, wherein one of the two stator windings which extend in the penultimate section is configured as a brake winding, as a drive-free winding or as a drive winding.

12. The device as claimed in claim 2, wherein one of the two stator windings which extend in the penultimate section is configured as a brake winding, as a drive-free winding or as a drive winding.

13. A device for braking a magnetic levitation railway, wherein a stator winding of a linear motor is short-circuited as a brake winding in a last section before an end of a route, and wherein two stator windings which extend alternately on the stator are present in a penultimate section, wherein one of the two stator windings which extend in the penultimate section is configured as a brake winding and is connected directly in series with the brake winding in the last section and the stator windings of the penultimate section and of the last section, which serve as brake windings, are connected to one another via a switch.

14. A device for braking a magnetic levitation railway, wherein a stator winding of a linear motor is short-circuited as a brake winding in a last section before an end of a route, and wherein two stator windings which extend alternately on the stator are present in a penultimate section, and the winding ends of the stator winding are connected to form a star point or in a triangular circuit for the purpose of short-circuiting.

15. A device for braking a magnetic levitation railway, wherein a stator winding of a linear motor is short-circuited as a brake winding in a last section before an end of a route, and wherein two stator windings which extend alternately on the stator are present in a penultimate section, and for each of the two stator windings extending in the penultimate section the ratio of the number of windings per unit distance increases in the direction of the last section in favor of the stator winding which is configured as a brake winding.

* * * * *